TELEVISION BAND WIDTH REDUCING SYSTEM

Filed April 5, 1954

8 Sheets-Sheet 1

INVENTOR
J. W. RIEKE
BY W. L. Kefauver
ATTORNEY

Oct. 29, 1957 J. W. RIEKE 2,811,578

TELEVISION BAND WIDTH REDUCING SYSTEM

Filed April 5, 1954 8 Sheets-Sheet 2

INVENTOR
J. W. RIEKE
BY W. K. Kefauver
ATTORNEY

Oct. 29, 1957 J. W. RIEKE 2,811,578

TELEVISION BAND WIDTH REDUCING SYSTEM

Filed April 5, 1954 8 Sheets-Sheet 3

INVENTOR
J. W. RIEKE
BY W. L. Keefauver
ATTORNEY

TELEVISION BAND WIDTH REDUCING SYSTEM

Filed April 5, 1954 8 Sheets-Sheet 4

INVENTOR
J. W. RIEKE
BY W. K. Kefauver
ATTORNEY

Oct. 29, 1957 J. W. RIEKE 2,811,578

TELEVISION BAND WIDTH REDUCING SYSTEM

Filed April 5, 1954 8 Sheets-Sheet 5

INVENTOR
J. W. RIEKE
BY
ATTORNEY

TELEVISION BAND WIDTH REDUCING SYSTEM

Filed April 5, 1954 8 Sheets-Sheet 6

INVENTOR
J. W. RIEKE
BY [signature]
ATTORNEY

INVENTOR
J. W. RIEKE
BY W. L. Keefauver
ATTORNEY

TELEVISION BAND WIDTH REDUCING SYSTEM

Filed April 5, 1954 8 Sheets-Sheet 8

INVENTOR
J. W. RIEKE
BY W. L. Keefauver
ATTORNEY

United States Patent Office
2,811,578
Patented Oct. 29, 1957

2,811,578

TELEVISION BAND WIDTH REDUCING SYSTEM

John W. Rieke, Basking Ridge, N. J., assignor to Bell Telephone Laboratories, Incorporated, New York, N. Y., a corporation of New York Application April 5, 1954, Serial No. 421,047

17 Claims. (Cl. 178—5.2)

This invention relates to the transmission of broad band signals and in particular to transmission over transmission media of restricted band width.

Many types of communication facilities are now available for point-to-point communication including open-wire, coaxial cable, and microwave radio relay systems. Although the band width of these various systems varies widely with the type of system, it is in each case restricted. One problem to which the present invention is directed is the utilization of existing facilities for the transmission of signals whose band width exceeds either that of a system or of a channel within a system over which it is desired to transmit the signal.

As a specific example, the L1 coaxial system links many cities of the country and provides a smooth transmission band of approximately three megacycles. In this instance, the band width of the system is determined primarily by the transmission characteristic of the coaxial cable circuit with which the various terminals are interconnected. Although a three-megacycle band width is sufficient to transmit many simultaneous telephone signals on a carrier basis, it is barely sufficient to transmit a monochrome television signal which nominally has a band width of four megacycles. This problem is discussed in an article entitled, "Television terminals for coaxial systems," by L. W. Morrison, Jr., Trans, A. I. E. E., November 1949. As mentioned in this article, it has been found practical to transmit monochrome television signals over the L1 system merely by translating the video signal, in frequency, so that it falls within the passband of the system and so that only the highest frequency components are attenuated. It has been found that this restriction imposed on roughly the upper megacycle of sidebands does not too seriously affect the received picture.

Color television signals, however, present new problems due to the nature of the signal which are not solved by these prior practices, and one object of the invention is to reduce the band width of a color television signal so that it can be transmitted over a system of restricted band width and still provide an acceptable picture for subscribers.

Another object of the invention is to decrease the number of component circuits required to transmit and receive both monochrome and color television signals.

A further object of the invention is to determine automatically whether a received signal is a monochrome signal or a color signal.

Another object of the invention is to switch automatically and rapidly from a monochrome to a color basis, or vice versa, in responce to a change in the character of the signal.

Other objects of the invention relate to the improvement of television and other broad band signal transmission in general.

In accordance with an illustrative embodiment of the invention which is described in more detail below, an automatic switch control determines by the presence or absence of the color subcarrier whether the signal to be transmitted is monochrome or color and performs switching operations as required by this determination. If monochrome, the full system band width is applied to the transmission of the luminance signal. If color, the signal band width is compressed by separating chrominance and luminance components, band limiting each, and then recombining the two by frequency translation in a band reduced signal. A feature of the invention is that the determination of the character of the signal is made automatically. Another feature of the invention is that the additional band limiting required for the luminance components of a color signal is not imposed on the signal to be transmitted if the signal is a monochrome signal.

Another feature is that frequency translation of luminance and chrominance components is accomplished in separate channels within the terminals so that differential phase and gain which might arise if translated in common apparatus are avoided.

These and other features and objects of the invention may be understood from a consideration of the following detailed description when read in accordance with the attached drawings, in which.

Figure 1:
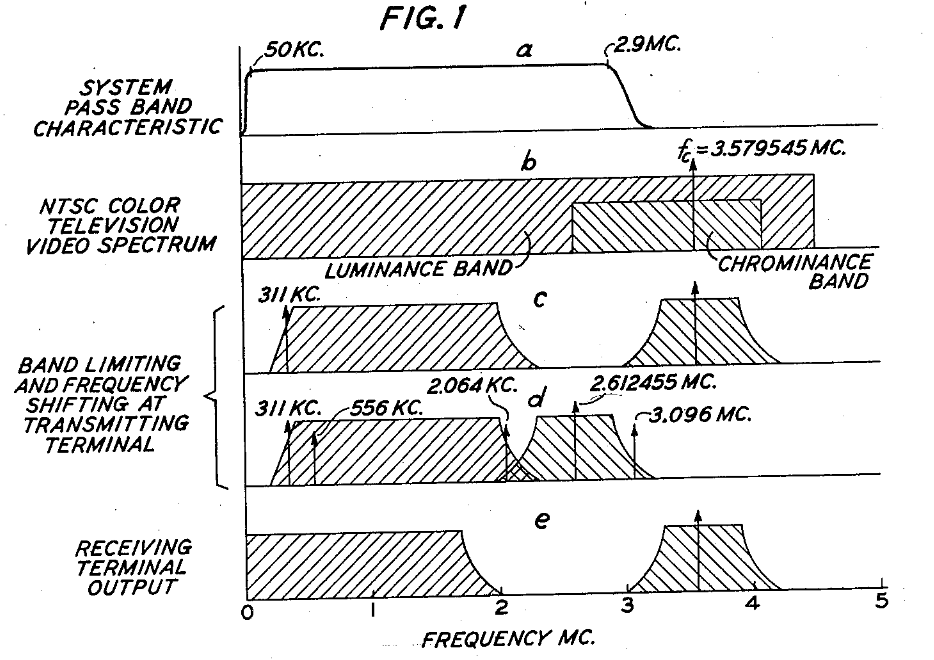
Fig. 1 illustrates frequency characteristics of the transmission medium and of the color signal both before and after band limiting and frequency translation in accordance with principles of the invention.

The nature of the problem and a general understanding of its solution may be gained by considering Fig. 1. The uppermost characteristic *a* in this diagram illustrates the transmission characteristic of a coaxial cable system similar to the L1 system, showing it to have a flat band transmission characteristic from 50 kilocycles to 2.9 megacycles. The second characteristic *b* illustrates spectral characteristics of the NTSC (National Television System Committee) color signal. This signal has luminance components from zero frequency up to 4.5 megacycles together with chrominance components in the form of sidebands centered about a color subcarrier at 3.579545 megacycles and extending downward from this subcarrier by 1.0 megacycle and upward by 0.6 megacycle. The principal luminance signal components are located at harmonics of the line scan frequency, and the color subcarrier is chosen so that chrominance sidebands occupy regions of relative insensitivity in the luminance signal, i. e., the luminance and chrominance signal components are interleaved to conserve band width. Although not indicated in the figure, the predominant luminance components lie below two megacycles, while the chrominance sidebands decrease in amplitude on either side of the color subcarrier. More details of the NTSC color signal may be found in an article by D. G. Fink in "Electronics" for December 1953 at page 138.

This signal obviously cannot be transmitted without modification over a system having the transmission characteristic illustrated because of both low and high frequency cut-offs. Further, if applied directly to such a system in accordance with prior art practices, intolerable degradation would result either through loss of the lower frequency and more significant luminance sidebands, or through loss of most of the chrominance components.

In accordance with principles of the invention, the band width of the signal is compressed by selecting dominant portions of the luminance band and dominant portions of the color band, band limiting each, and by combining them into a resultant reduced band signal. A transmitter for accomplishing this is illustrated functionally in Fig. 2. The input video signal is applied both to a modulator 11 and a band-pass filter 12. The modulator 11 and following low-pass filter 13 with a cut-off of two megacycles represent the luminance channel of the transmitter and the band-pass filter 12 followed by a modulator 14 and high-pass filter 15 with a low frequency cut-off of 2.3 megacycles represent the chrominance channel. As illustrated by *c* of Fig. 1, the luminance channel shifts the video frequency spectrum luminance signals upwards by 311 kilocycles and provides a vestigial sideband signal characteristic with a carrier at 311 kilocycles and an upper sideband extending to two megacycles.

The band-pass filter 12 in the chrominance channel selects a band of .6 megacycle centered roughly about the color subcarrier also as illustrated in *c* of Fig. 1. The band limited chrominance components are applied to a modulator 14 which is fed also by a 6.192 megacycle carrier from a carrier supply 16. This modulator shifts the chrominance components downward in frequency so that they are centered about 2.612455 megacycles. The high-pass filter 15 insures a lower cut-off of the chrominance components of 2.3 megacycles so that when the chrominance and luminance components are combined for transmission over the coaxial cable 17, they are separated by a guard band of roughly .3 megacycle. The combined luminance-chrominance components are illustrated by *d*, Fig. 1.

Figure 2:
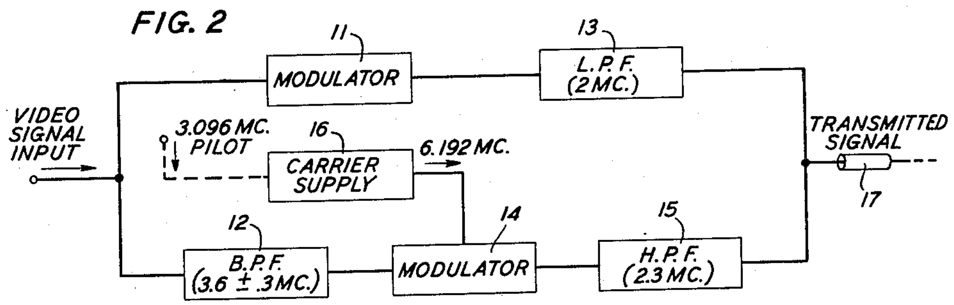
Figs. 2 and 3 illustrate functionally the solution of one aspect of the problem at the transmitting terminals and the receiving terminals, respectively, in accordance with principles of the invention.

As may be seen from *d*, the reduced band signal occupies a band of slightly less than three megacycles which can be accepted by the coaxial system whose characteristic is illustrated in *a*. Also superimposed on the transmitted signal by means not shown in Fig. 2 are three pilots for gain equalization purposes at 556 kilocycles, 2.064 megacycles, and 3.096 megacycles. These frequencies are chosen so that they fall within regions of comparative insensitivity in the television signal.

Figure 3:
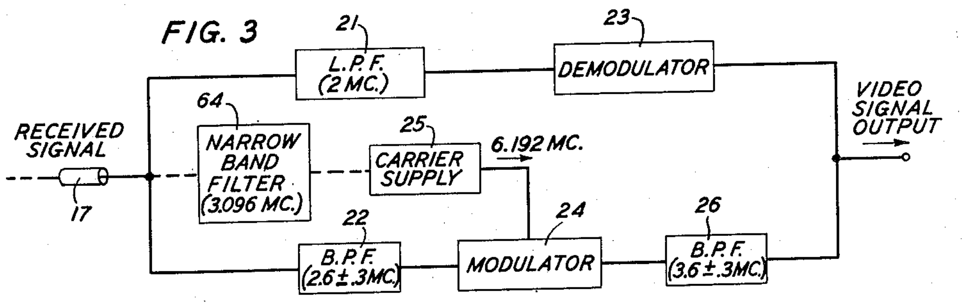

At the receiver, illustrated in Fig. 3, the transmitted signal is again split between its two channels by a low-pass filter 21 which selects the luminance components and a band-pass filter 22 which selects the chrominance components. The luminance signal is demodulated in a demodulator 23. A parallel chrominance channel provides for a frequency shift back to the original NTSC color subcarrier allocation by the modulator 24 and associated carrier supply 25 and for band limiting by the band-pass filter 26. The two channel outputs are recombined to form once again the NTSC color signal minus a band of sidebands from roughly 1.7 megacycles to 3.2 megacycles, as illustrated by *e* in Fig. 1. It has been found that despite this modification of the original color signal, an acceptable color picture is obtained.

As suggested in Figs. 2 and 3, the carrier supply circuits 16 and 25 may utilize the 3.096 megacycle pilot, already present in the system, as a basic carrier source.

The two megacycle low-pass filter 13 in the luminance channel of the transmitter degrades somewhat the luminance signal. This degradation need not be taken when monochrome signals are being transmitted. Therefore, an automatic switching feature, to be described below, is provided which removes this low-pass filter as well as the chrominance channel from the transmission path whenever monochrome signals are transmitted. As will be discussed, the automatic switching circuits determine by the presence or absence of the color synchronizing burst whether the signal is color or monochrome and perform rapid switching functions to achieve these ends.

Figure 4:
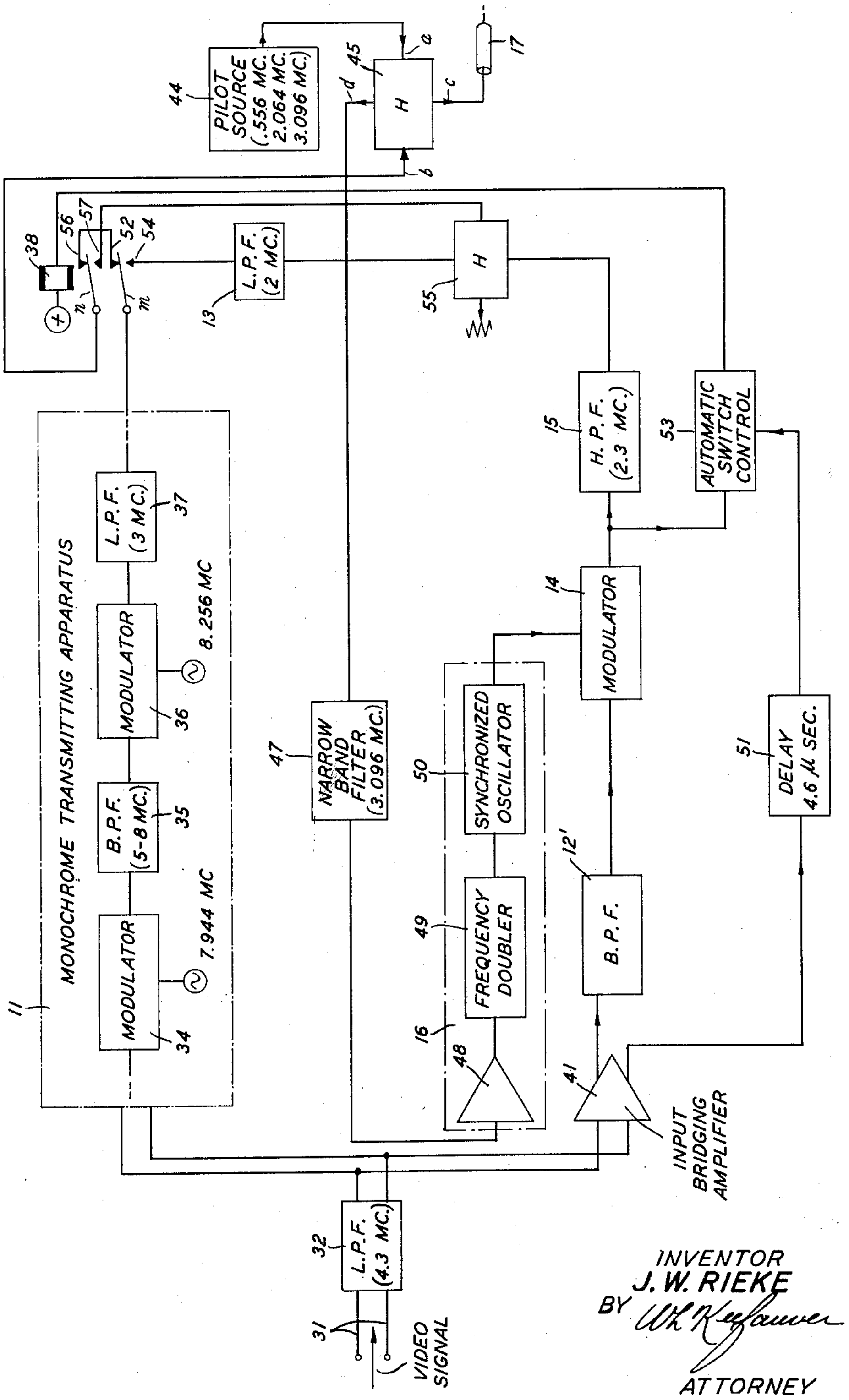
Figs. 4 and 5 illustrate by block schematic diagram color television transmitting terminals and receiving terminals, respectively, embodying principles of the invention.

An illustrative transmitting terminal is illustrated in block diagram form in Fig. 4. The television terminal receives the video signal over a 110-ohm balanced line 31 from the video transmission system. Extraneous sidebands are removed by a low-pass filter 32 having a 4.3 megacycle cut-off which passes the entire video signal but attenuates any higher frequency and interference. Since the incoming signal may contain both monochrome and color information, two paths are provided, one for monochrome and the other for color.

Figure 8:
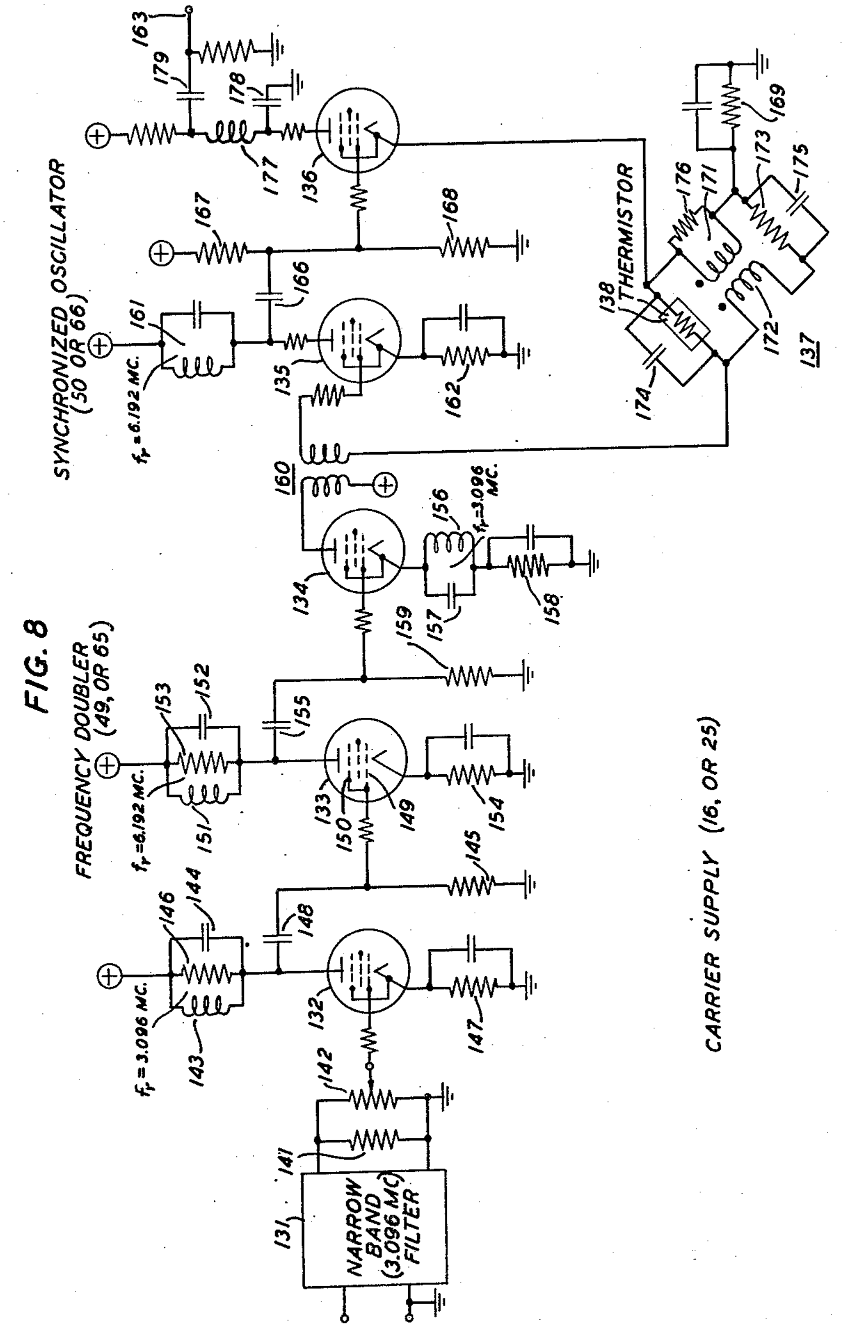

The monochrome signal is applied to standard monochrome transmitting apparatus 11, which is described more fully in the above-identified Morrison article with particular reference to Fig. 8. For present purposes, it may be considered as comprising two stages of modulation with suitable filters for selecting desired sidebands of the modulation processes. A double modulation process is employed because of the small amount of frequency translation required, 311 kilocycles, relative to the band width of the signal. In the first modulator 34, the signal is modulated with a carrier frequency of 7.944 megacycles. The band-pass filter 35 selects the resultant lower sideband together with a vestige of the upper sideband which is remodulated by a second modulator 36, this time with a carrier located at 8.256 megacycles. The lower sideband of this modulation process is selected by the following low-pass filter 37 which lies between roughly 200 kilocycles and 3.1 megacycles with the original zero video frequency located at 311.27 kilocycles. This frequency position is the one desired for transmission over the coaxial line. The output of the monochrome transmitting apparatus is applied to the armature *m* of a relay 38, the purpose of which will be described later.

The chrominance channel comprises an amplifier 41 bridged across the input line followed by a band-pass filter 12' which selects from the video signal the color band centered around the color subcarrier at approximately 3.6 megacycles and provides at least 30 decibels attenuation to luminance sidebands below two megacycles. This filter may have a fairly sharply defined pass-band of .6 megacycle or may merely provide discrimination against luminance components. If the latter, band limiting is then achieved solely by filter 15 and cable system 17. The selected chrominance components are then applied to a modulator 14 where they are modulated with a 6.192 megacycle carrier.

The 6.192 carrier is derived from the 3.096 megacycle pilot frequency of the carrier system. The three pilot carriers from source 44 are applied to arm *a* of a hybrid junction 45 where they are combined with the television signal applied to arm *b* for transmission over the coaxial line 17. The combined signals appear in arm *d* as well as in arm *c*. The 3.096 megacycle carrier in arm *d* is selected by a narrow band filter 47, amplified by a three megacycle amplifier 48 and applied to a frequency doubler 49 which generates a 6.192 megacycle signal. This signal is employed to synchronize a 6.192 megacycle oscillator 50 whose output is applied to the modulator 14 to shift the chrominance band to a new frequency band centered about a new color subcarrier of 2.612455 megacycles. The output from the modulator is restricted to frequencies above the luminance band by the high-pass filter 15 which has a lower cut-off frequency of 2.3 megacycles. The upper end of the chrominance band is shaped primarily by the cable 17 and associated transmission system.

The relay 38 is normally operated and remains operated if the input signal on the video line 31 is a monochrome signal. While operated, the output of the monochrome apparatus 11 is applied directly to the transmitting hybrid 45 via armature *m*, contact 52, contact 56, and armature *n*, where it combines with the three pilots for transmission over the coaxial line.

In accordance with principles of the invention, however, the relay 38 is released by the automatic switch control 53 when the latter determines that the input video signal is a color signal.

The automatic switch control determines the monochrome or color nature of the input signal. The illustrative control described in more detail below comprises a gating circuit which recurrently samples the input signal and determines by time gating of one signal by another whether the color burst of color subcarrier is present or absent. Although simple amplitude gating could be employed, time gating as described below is preferred since it increases the margin of reliability. The color burst occurs in known time relation to the regular television synchronizing wave form, namely, 4.6 microseconds after the video synchronizing pulse. The synchronizing pulses obtained from the video signal at a second output of the bridging amplifier 41 and delayed by the 4.6 microsecond delay 51, therefore, provide the basis for time sampling the received signal for energy at the frequency of the color subcarrier.

Any component in the input signal which varies significantly in amplitude or other characteristic with the monochrome or color nature of the signal could serve as a reference. With the NTSC signal, however, the color subcarrier provides a readily available reference since the energy level of a monochrome signal at this frequency will be considerably below that of a color signal at the same frequency.

The automatic switch control, therefore, is "conditioned" or partially enabled by each synchronizing pulse; and if the energy level of the input from the chrominance modulator 14 at the frequency of the color subcarrier exceeds a threshold, normally operated relay 38 is caused to release and by way of armature *m* and contact 54, apply the output of the monochrome transmitting apparatus 11 through a band limiting low-pass filter 13 having a cut-off of two megacycles to a mixing hybrid 55. The band limited luminance components combine in hybrid 55 with the band limited chrominance components from filter 15 and over contact 57 and armature *n* of relay 38, the combined components are applied to arm *b* of the transmitting hybrid 45, where they are further mixed with pilots from source 44 before transmission over the coaxial cable 17. If the color subcarrier is absent at the output of modulator 14, the automatic switch control 53 will produce no output signal and relay 38 will remain operated, thereby applying the full luminance signal from the monochrome apparatus 11 to the cable 17 and disconnecting the chrominance channel from the transmitting hybrid 45.

The automatic switch control 53, therefore, routes input video signals through the monochrome processing apparatus comprising apparatus 11 if the color burst is absent and through the color processing apparatus comprising apparatus 11 plus filter 13 and the parallel chrominance channel, elements 41, 12, 14, and 15 if the color burst is present.

Figure 5:
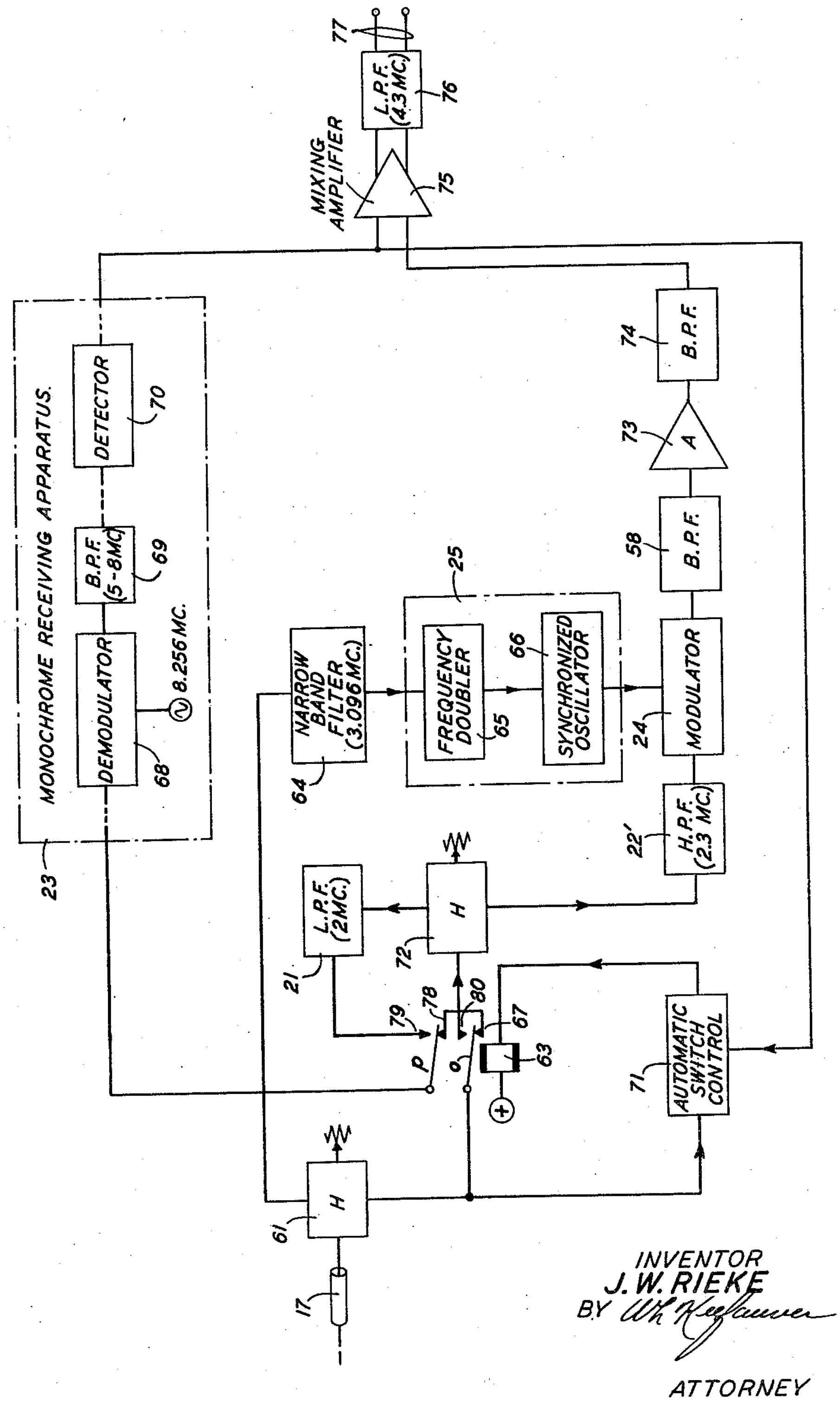

At the receiver, Fig. 5, the band reduced signal is received from the coaxial line 17 and applied to a hybrid transformer 61, one output of which is connected to the armature *o* of a relay 63. The other output of the hybrid 61 is applied to a narrow band filter 64 which selects only the 3.096 megacycle pilot from which a 6.192 megacycle carrier is derived by a doubler 65 and oscillator 66 in a manner similar to that in the transmitting terminal. The relay 63 is "normally" operated so that the input signal is normally applied via contacts 67 and 78 and armature *p* of relay 63 to the input of standard monochrome receiving apparatus 23. This apparatus is also described in more detail in the above-mentioned Morrison article and is illustrated here as comprising a demodulator stage 68 fed by an 8.256 megacycle carrier, a band-pass filter 69 which selects the lower sideband of this modulation process, and an envelope detector 70 which recovers the original video signal. A pilot elimination filter, not shown, is also included in this apparatus.

The input signal is also applied to an automatic switch control 71 which may be substantially identical with the switch control 53 at the transmitting terminal. The synchronizing pulses applied to a second or gating input of the switch control 71 are obtained from the signal output of the monochrome receiving apparatus 23 and, in this case, no delay network is necessary since the delay of the receiving apparatus is approximately 4.6 microseconds. If a color burst and a synchronizing pulse coincide in the automatic switch control, the relay 63 releases so that the input signal is applied via armature *o* and contact 80 to a bridging hybrid 72 instead of directly to the receiving monochrome apparatus 23.

The bridging hybrid 72 divides the signal between two channels, a chrominance channel and a luminance channel. The luminance channel, with relay 63 released, includes a two-megacycle low-pass filter 21 which selects only the luminance component for application via contact 79 and armature *p* of relay 63 to the monochrome receiving apparatus 23. The high-pass filter 22 in the chrominance channel, with a low frequency cut-off of 2.3 megacycles, passes only the chrominance components which lie in a band from 2.3 to 2.9 megacycles and is the principal band shaping device in the chrominance channel. The modulator 24, fed with a 6.192 megacycle carrier derived from the 3.096 megacycle pilot, shifts the chrominance components to the standard NTSC location with the color subcarrier at approximately 3.6 megacycles. Filter 58, with a passband centered at 3.6 megacycles, selects the lower sidebands of this modulation process which are then amplified by an amplifier 73. They then pass through a second band-pass filter 74, and, together with the luminance components at the output of the monochrome apparatus 23, are applied to a mixing amplifier 75. Amplifier 75 combines the two components in a signal whose luminance and chrominance components lie within NTSC assignments (*e* in Fig. 1). The resultant video signal is passed through a 4.3 megacycle low-pass filter 76 to a balanced video line 77. Filter 76 prevents high frequency products from getting onto the line 77 and causing distortion.

It can be noted from Figs. 4 and 5 that, as one feature of the invention, many components of the transmitting and receiving terminals are substantially identical, at least in the function they perform. As will be seen, they can in most cases be substantially identical circuitwise also, thereby simplifying manufacturing of transmitting and receiving terminals. Other features of the terminals just described are that the 3.096 megacycle pilot frequency which must be transmitted for gain equalization purposes is utilized for deriving a modulation carrier in both the transmitting and receiving terminals. A separate highly stable source of carrier waves is, therefore, unnecessary. Another feature is that the band limiting imposed on the luminance components is imposed only if the incoming signal is a color signal and that, by virtue of the automatic switch control, the determination of the nature of the input signal is quickly made.

Apparatus to perform the functions illustrated in Figs. 4 and 5 is illustrated in the following figures. In the circuits to be described, all undesignated capacitors connected to ground are merely bypass elements and will not be further identified. Further, in many of the circuits, low value resistances of the order of 20 to 50 ohms are connected directly to grid, screen, or plate electrodes to prevent singing which might arise due to the inherent reactance of the tube elements. These resistances are unlabelled and will not be further identified. Further, unless illustrated, screen grid potentials are derived by conventional voltage dividers connected to the plate power supply and have been omitted for a clearer presentation.

Figure 6:
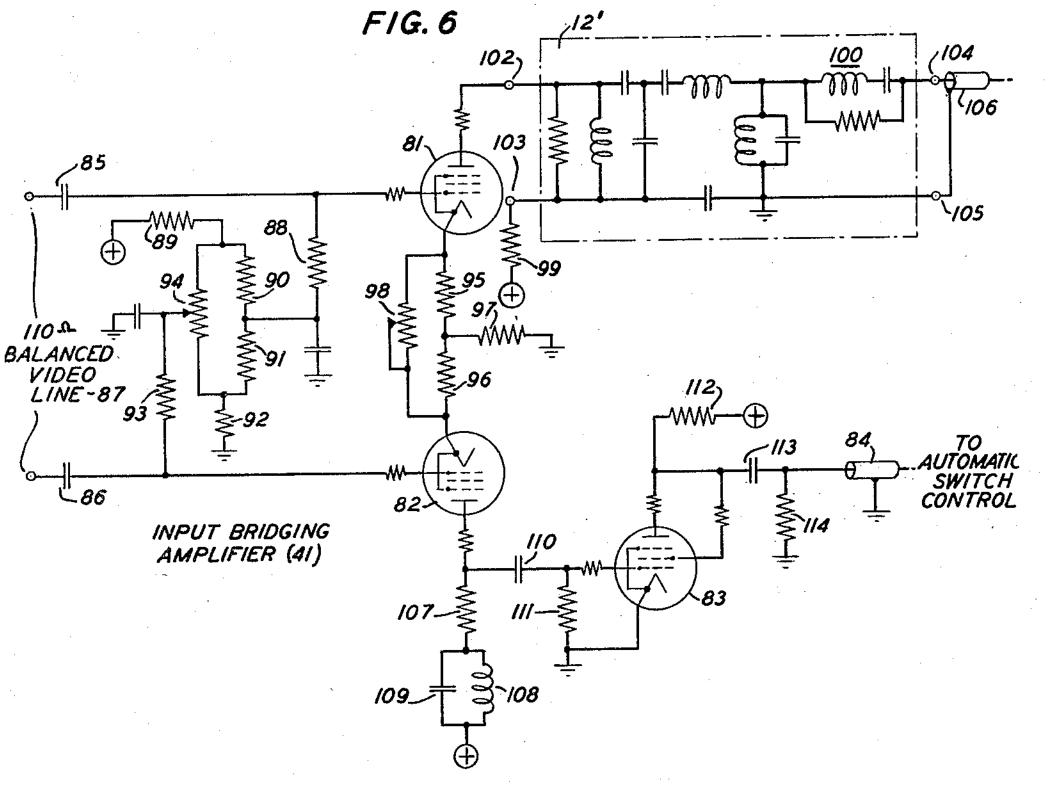
Figs. 6 through 11A are circuit schematic diagrams of the various components of the transmitting and receiving terminals illustrated by block diagram in Figs. 4 and 5.

Fig. 6 illustrates the input bridging amplifier which appears only in the transmitting terminals; band-pass filter 12 is also shown. The main purpose of this amplifier is to bridge onto a 110-ohm balanced line and deliver two outputs, one an unbalanced signal including the frequency range from 3.3 to 3.9 megacycles into a 75-ohm circuit and a second unbalanced output which includes the complete television signal.

The amplifier comprises a pair of vacuum tubes connected as a balanced amplifier. The first tube 81 is followed by a band-pass filter 12' which allows the passage of only the color subcarrier and its sidebands. The second tube 82 is coupled through a third tube 83 which delivers the amplifier video signal to an output 84 which connects to the automatic switch control 53.

The control grids of the two tubes 81 and 82 are connected through coupling condensers 85 and 86, respectively, to opposite sides of the 124-ohm balanced cable 87 containing the video signal. The grid return of the first tube is through a resistor 88 to a potential divider comprising resistors 89—92. The grid of this tube is +60 volts above ground. The control grid of the second tube 82 returns through a resistor 93 to the potentiometer 94. Adjustment of this potentiometer allows the grid of the second tube to become either positive or negative with respect to the grid of the first tube, thus effectively balancing the gains of the two tubes. The cathodes of these tubes 81—82 operate at approximately 62 volts above ground which is obtained from plate current drop through resistors 95, 96, and 97. Further, signal current through these resistors 95—97 provides large negative feedback which is used for the suppression of longitudinal signals which in turn enhances the circuit balance. Suppression of longitudinal components in this manner is described more fully in S. Doba Patent 2,226,238, dated December 24, 1940. A potentiometer 98 supplies metallic feedback and provides a gain control for the through signal.

The plate of tube 81 is connected through a portion of the band-pass filter 12' and a plate dropping resistor 99 to the power supply. The filter, therefore, is the plate load for the vacuum tube 81 and serves also the dual purpose of coupling a high impedance plate to a low impedance line as well as providing discrimination for all frequencies outside the color spectrum. This filter is essentially a constant-k type filter plus a section 100 designed to provide impedance correction for frequencies in the range of 10 to 15 megacycles. The impedance transformation provided by this filter is 1100 ohms at terminals 102—103 to 75 ohms at terminals 104—105, the latter matching the impedance of the coaxial cable 106 which connects to the modulator 14.

The plate of the second vacuum tube 82 is connected through a load resistor 107 and a high frequency compensating network comprising inductor 108 and capacitor 109 to the power supply. The plate of this tube is also connected through a coupling capacitor 110 to the control grid of the third tube 83 whose grid return is the resistor 111. The plate and screen grids of this triode connected pentode are connected to the plate supply through a dropping resistor 112. The plate is coupled to the output through a coupling capacitor 113. The resistor 114 provides a 75-ohm output for matching to a coaxial line.

As may be seen from Fig. 4, the filtered output of the first tube is applied to the chrominance modulator 14 and the full video output of the second tube is applied through a delay network 57 to the automatic switch control 53.

Figure 7:
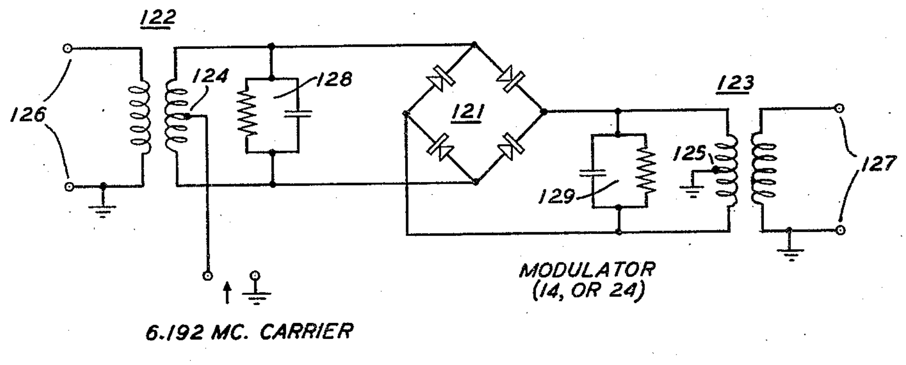

The chrominance modulator or demodulator, as the case may be, is illustrated in Fig. 7. Its designation as a modulator or demodulator depends on whether it is being used in the transmitting or receiving terminal. At the transmitter, it is used as modulator 14 to modulate a television color signal from its normal frequency spectrum to its position in the coaxial transmission range of 2.3 to 2.9 megacycles. At the receiver, it is used as demodulator 24 to reverse this process.

The modulator comprises a varistor bridge 121 connected between two transformers 122 and 123. 6.192 megacycle carrier is supplied between the center taps 124 and 125 of the balanced windings of the two transformers, noting that the center tap 125 of the output transformer is grounded. Signal is applied between the terminals 126 of the input transformer. Modulation takes place in a well-known manner in the varistor bridge 121, and output is taken from the terminals 127 of the output transformer. Since the modulator is of the double balanced type, considerable discrimination is obtained through transmission of both the carrier and the signal. Discrimination is also provided against many other unwanted sidebands.

The resistance-capacitor networks 128 and 129 shunting the input and output transformers are impedance-correcting networks designed to give an acceptable impedance over the operating frequency range.

The carrier supply network for the modulator or demodulator, as the case may be, is illustrated in Fig. 8. The purpose of this circuit is to deliver to the modulator, or demodulator, a frequency of 6.192 megacycles at a level of +20 dbm.

In general, a narrow band filter 131 at the input of the circuit permits the passage of the 3.096 megacycle pilot and rejects all other frequencies present. This frequency is amplified by tube 132 and then doubled by a square law amplifier 133. After further amplification by an amplifier 134, it is used to synchronize a bridge stabilized oscillator 50 which generates the 6.192 megacycle carrier. The oscillator consists of a 30 db gain tuned amplifier 135 and a feedback network containing a self-balancing bridge 137 whose variable arm is a thermistor 138. The thermistor controls the bridge balance and thereby determines the amplitude of the oscillations. A power amplifier stage 136 followed by a single frequency transformer provides the required power output.

The oscillator 50 is based on the Meacham bridge stabilized oscillator described in L. A. Meacham Patents 2,163,403, June 20, 1939, and 2,275,452, March 10, 1942. It differs, however, from the conventional Meacham oscillator in several important respects. First, the bridge 137 contains no frequency determining elements such as a quartz crystal. Instead, the frequency of oscillations is determined to a first approximation by the phase around the feedback loop and is then accurately fixed by a synchronizing signal derived from the 3.096 megacycle pilot which is injected into the oscillator by the transformer 160. The variable element in the bridge is a thermistor 138 whose temperature varies until the bridge is balanced. The bridge maintains not only the usual criterion for stable oscillation but, in addition, cancels out the synchronizing signal at the point of injection. Therefore, when the output of the oscillator is precisely of the same frequency as the synchronizing signal, the input synchronizing signal is exactly balanced by an oppositely phased sample of the output.

The use of a synchronized oscillator eliminates the need of an additional source of highly stable oscillations. Further, the synchronized oscillator shown has advantages over the usual type of synchronized oscillator in which synchronism is obtained in an amplifier which is operating non-linearly; the amplifier in the oscillator 50 operates in its linear range with amplitude regulation provided by the bridge 137. This avoids a non-linear source of harmonic generation and aids in maintaining wave form purity.

Another way in which the oscillator shown differs from the conventional Meacham oscillator is that two of the bridge arms comprise transformer windings 171 and 172 instead of resistors. This reduces the power requirements on the output tube 136 since it avoids the loss of power which would be obtained if resistors were employed.

In more detail, the input filter 131 is terminated in two resistors 141 and 142, the second of which acts as a control for adjusting the level of 3.096 megacycle input to tube 132. The first tube 132 is a pentode which functions as a tuned amplifier. The tuned plate load comprises the inductor 143 and capacitor 144 which are tuned to resonance at a frequency $f_r$ of 3.096 megacycles. The resistor 145 damps the tuned circuit and determines the band width of the stage. Resistor 146 is a plate dropping resistor and bypassed resistor 147 provides self-bias for tube 132.

The plate of this tube is connected through a coupling capacitor 148 to the control and suppressor grids 149 and 150, respectively, of the second stage. This stage also has a tuned plate load comprising an inductor 151 and capacitor 152 tuned to resonance at a frequency $f_r$ of 6.192 megacycles. This tube has suppressor and control grids, both of which assert considerable influence on the electron flow between cathode and plate. These grids, individually, effect a linear control over the output current; but by tying them together, their control multiplies and the vacuum tube is given an output characteristic generally following a square law. This stage is, therefore, an effective frequency doubler, with the tuned plate load 151—152 selecting the second harmonic. An example of a tube which may be used to perform this function is the Western Electric 415A. Resistors 153 and 154 are plate dropping and self-biasing resistors, respectively.

The 6.192 megacycle output of tube 133 is coupled through a capacitor 155 to the control grid of a third stage 134. This is an amplifier stage with a parallel resonant circuit inserted in the cathode lead. This circuit comprises inductor 156 and capacitor 157 and is tuned to resonance at a frequency $f_r$ equal to 3.096 megacycles. This resonant circuit provides large negative feedback at this frequency and thereby tends to suppress transmission of the 3.096 megacycle fundamental. Bypassed resistor 158 provides self-bias with resistor 159 being the grid return.

The 6.192 megacycle signal is effectively amplified by tube 134 and coupled through a transformer 160 to the control grid of a fourth stage comprising tube 135. This stage also has a resonant plate network 161 tuned to 6.192 megacycles. The cathode of tube 135 operates at +13 volts due to self-bias developed by the bypassed cathode resistor 162. The grid of the tube operates at +11 volts which is obtained through its direct-current connection via the secondary of transformer 160 and bridge 137 to the cathode of vacuum tube 136. Tube 135, therefore, has a working bias of two volts.

The plate of tube 135 is connected through a coupling capacitor 166 to the control grid of a final stage 136 which operates at +9 volts obtained from the power supply through a resistance divider comprising resistors 167 and 168. Eleven volts of self-bias for this tube are developed by the bypassed cathode resistor 169 so that it also has an operating bias of two volts.

The cathode of tube 136 is connected to one side of a bridge comprising a transformer having primary and secondary windings 171 and 172, a thermistor 138, and a resistor 173, the latter two elements being partially bypassed by capacitors 174 and 175, respectively. When power is first applied to the circuit, the resistance of the thermistor 138 is very high and very little negative voltage is coupled through it and the transformer 158 to the grid of vacuum tube 136. However, considerable voltage is coupled to the grid of this tube from the secondary winding 172 of the transformer 171—172 which is poled to apply a positive feedback voltage to the control grid of the tube 135. This large positive feedback voltage starts the circuit oscillating at a frequency which is controlled by tuned circuit 161 which is a principal factor in controlling the phase around the feedback loop and at an amplitude which is limited only by the capabilities of the vacuum tubes. As the thermistor heats up, its resistance decreases and more negative feedback voltage is coupled through it from the cathode of vacuum tube 136 to the grid of vacuum tube 135. This reduces the amplitude of the oscillations, and this action continues until the 30 db forward gain from the control grid of vacuum tube 135 to the cathode of vacuum tube 136 is exactly equalized by a 30 db bridge balance. When this condition is reached, uniform oscillation becomes sustained. Any tendency to shift from this oscillatory condition is compensated by resistance changes in the thermistor 138 which results in a restoration of the operating point.

The condenser 174 in shunt with the thermistor bypasses a small amount of negative feedback voltage around the thermistor and prevents the circuit from blocking when power is first applied. The thermistor 138 also controls the cathode current of vacuum tube 136 and thereby makes the output of this tube fairly independent of its gain. This means that considerable aging of vacuum tube 136 can take place with little change in its output. Resistance 176 reduces the impedance of the 171 winding of transformer 171—172, thus requiring additional cathode current from vacuum tube 136 to maintain the bridge balance. Since this cathode current is supplied through the output circuit, resistance 176 also controls the value of the output power. The 6.192 megacycle frequency, which is injected into the grid circuit of vacuum tube 135 from the plate of vacuum tube 134, acts as a synchronizing frequency for the oscillator stage.

6.192 megacycle energy from the plate of tube 136 is coupled through a single frequency transformer comprising inductance 177 and condenser 178 to the output 163 which connects through condenser 179 to the chrominance modulator 14 or 24.

If desired, the carrier supply could comprise an unsynchronized bridge-stabilized oscillator having frequency selective elements within the bridge such as a quartz crystal included in the bridge circuit. This would eliminate the need for means for deriving the 3.096 megacycle carrier from the pilot supply and the means for translating it into a 6.192 megacycle synchronizing signal. It would, however, require a highly stable oscillator. The arrangement shown utilizes the already existing stable oscillator in the system which generates the pilot frequencies.

Figure 9:
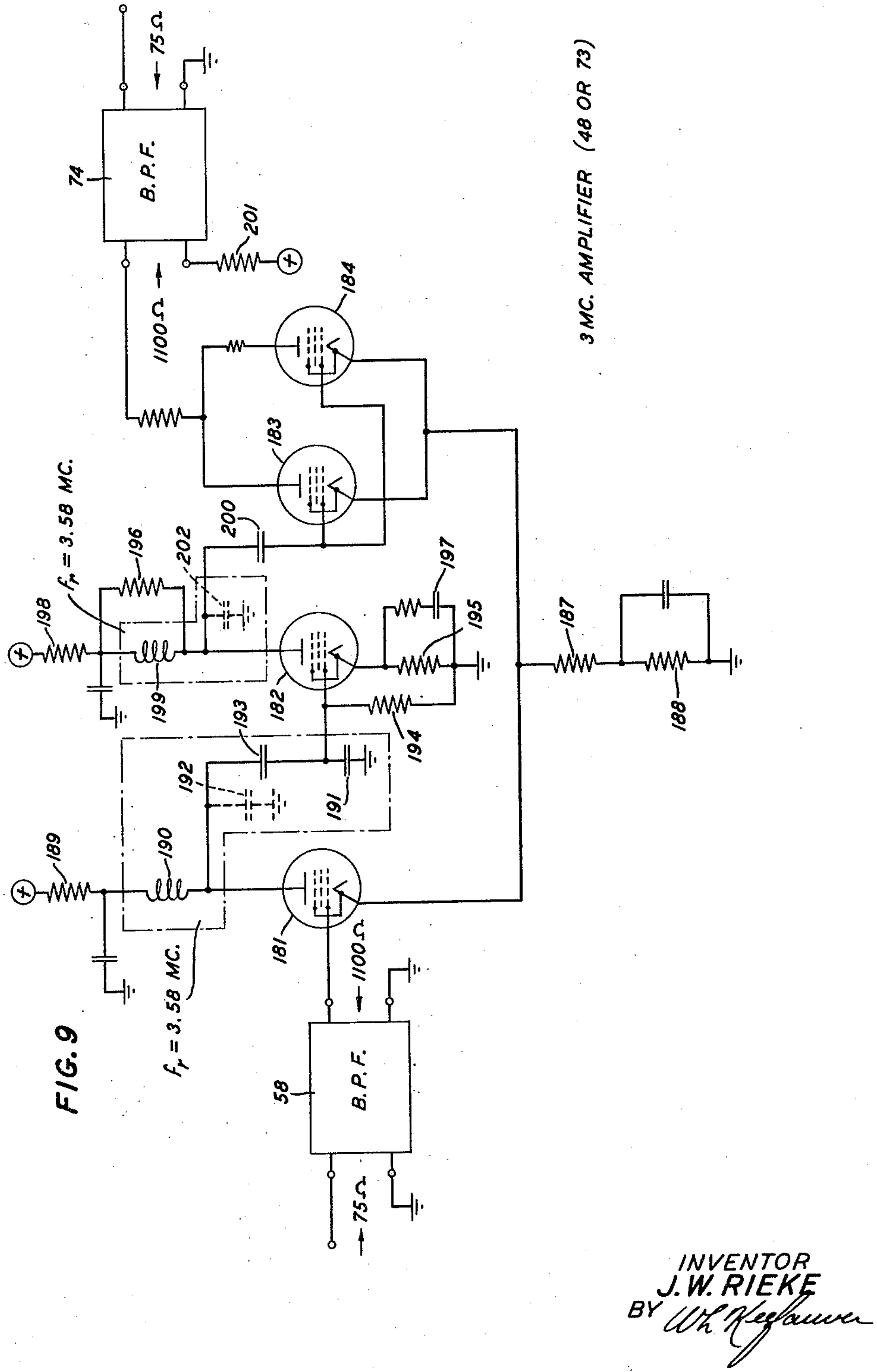

The 3.6 megacycle amplifier, which at the transmitter is used to amplify the pilot frequency in the carrier supply circuit, amplifier 48, and at the receiver to amplify the output of the chrominance modulator, amplifier 73, is illustrated in Fig. 9.

This circuit consists of a three-stage tuned feedback amplifier. The first two stages comprising pentodes 181 and 182 have their plate circuits tuned to 3.58 megacycles. The third stage comprises two tubes 183 and 184 in parallel to supply sufficient output power. Some band limiting is provided by the input and output filters, which also serve as coupling devices from high impedance tube elements to low impedance cables. These filters have pass-band characteristics centered at 3.6 megacycles which are broad enough to include the 3.096 megacycle pilot when employed at the transmitters.

In more detail, the input band-pass filter 185 provides good transmission to frequencies between 3.3 and 3.9 megacycles. This filter, which may be identical with filter 12 illustrated in Fig. 6, also provides an impedance transformation from 75 to 1100 ohms from the input cable to the grid of the first vacuum tube. Grid bias for the first tube 181 and also for the two output tubes 183—184 is provided by the voltage drop across resistors 187 and 188 due to the combined cathode currents of these three vacuum tubes. Resistor 188 is bypassed by a condenser, leaving only resistor 187 as the common cathode feedback resistance. Odd-stage negative feedback of this type is disclosed in J. M. West Patent 2,227,048, dated December 31, 1940.

Power is applied to the plate of the first vacuum tube through a dropping resistor 189 and inductance 190. The tuned plate load of this tube comprises this inductance 190, a padding condenser 191, and the inner stage capacity 192 of tubes 181 and 182, and is adjusted for resonance at 3.58 megacycles. Condenser 193 couples the plate of tube 181 to the control grid of tube 182.

Vacuum tube 182 receives its grid bias through grid resistor 194 from the voltage drop across the cathode resistor 195. Resistor 196 determines the gain of the second stage. Resistor 195, partially bypassed by capacitor 197, supplies a small amount of local negative feedback to this tube. Power is applied to the plate of this tube through a dropping resistor 198 and a tuning coil 199. This coil 199 and the interstage capacity 202 are tuned to resonance at 3.58 megacycles.

The tubes 183 and 184 in parallel comprise the output stage, to which the output of the second stage is applied through a coupling condenser 200. As mentioned above, grid bias is obtained from the voltage drop across the two resistors 187—188 common to the first and third stages. Power is connected to the plates of these tubes through the output band-pass filter 186 and a dropping resistor 201. This filter and its manner of connection may be similar to the filter 12 shown in Fig. 6. This filter also performs the similar functions of band shaping, impedance transformation, and plate load.

Figure 10:
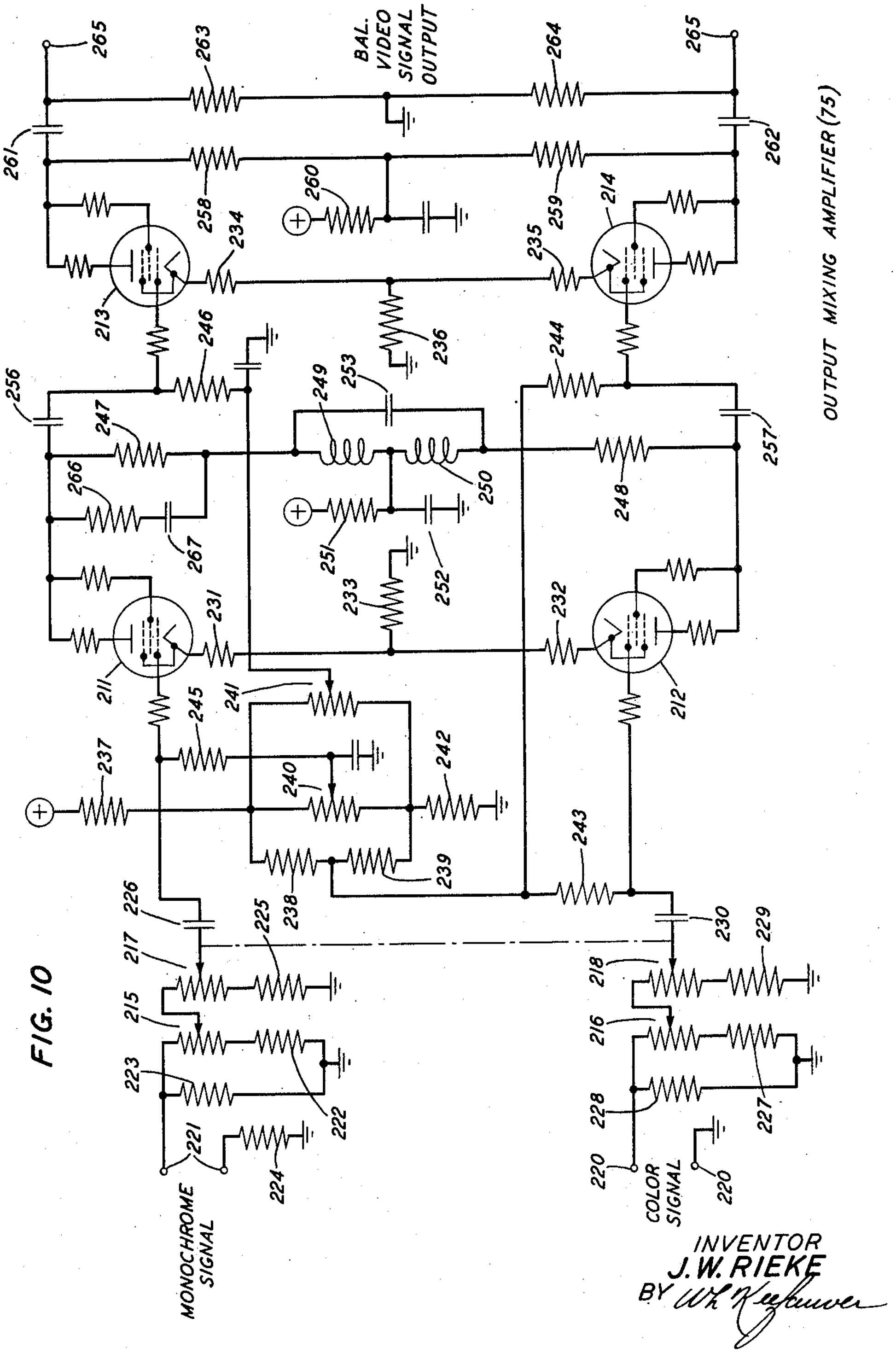

The output mixing amplifier 75 employed at the receiving terminals to combine the chrominance and luminance components when a color signal is received is illustrated in Fig. 10. This circuit accepts either or both of the 75-ohm unbalanced input signals and delivers a balanced 124-ohm output signal, which is the composite of the two input signals.

This circuit consists of two balanced stages of amplification. The first stage comprising tubes 211 and 212 is arranged to accept separate unbalanced inputs and to cause their addition in its output. Some unbalance is present in this output signal, and the second stage comprising tubes 213 and 214 tends to reduce this unbalance as well as to provide sufficient output power into a low impedance line. Two gain controls 215 and 216 are provided to adjust the level of the luminance and chrominance signals separately, and a common control comprising the ganged potentiometers 217 and 218 adjusts their combined outputs.

The detailed operation of the circuit is as follows. A monochrome signal is connected through the tip lead of a balanced video cable 221 to a potentiometer 215. The resistor 222 limits the range of the luminance gain control 217 to approximately 10 decibels. A second resistor 223 shunts both the potentiometer 215 and resistor 222 and makes their combination equal to 55 ohms, which terminates the tip lead of the video cable 221. The ring lead is terminated in a resistor 224 and is not further used. The movable arm of the potentiometer 215 is connected to a second potentiometer 217, which is connected to ground through a padding resistor 225 which limits control of this second potentiometer to 5 decibels. The movable arm of this latter potentiometer is coupled through a condenser 226 to the control grid of vacuum tube 211.

The band limited chrominance components of the color signal are connected through an unbalanced input cable 220 to a potentiometer 216 which provides a separate level control for the chrominance components. Resistors 227 and 228 are similar in function to the resistors 222 and 223 described above. The movable arm of the potentiometer 216 is coupled to a second potentiometer 218 and padding resistor 229 which are similar to the potentiometer 217 and resistor 225 mentioned above. The movable arms of these two potentiometers are linked together so that, together, these potentiometers provide a control common to both channels which provides a 5 decibel gain variation. If desired, potentiometers 217 and 218 may comprise 11 point switches chosen to give one-half decibel gain steps between switch points. The condenser 230 couples the chrominance components to the grid of the second vacuum tube.

The cathodes of the two tubes 211 and 212 are connected together through two resistors 231 and 232 which supply local feedback for each tube and tend to stabilize their plate currents. The two cathodes return to ground through a large common cathode resistor 233 which provides effective summing of the two input signals in the output plate circuit. The cathodes of these two tubes thus operate about 38 volts above ground. Vacuum tubes 213 and 214 have a similar arrangement provided by resistors 234—236. Bias for all four tubes is supplied by returning their control grids to a positive voltage derived from the power supply through a voltage divider composed of resistors 237—242.

The control grids of vacuum tubes 212 and 214 return through their grid resistors 243 and 244, respectively, to the junction point of resistors 238 and 239. This ties these two grids down to +36 volts so that tubes 212 and 214 have approximately two volts of grid-cathode bias. The grids of the other two tubes 211 and 213 return through their grid resistors 245 and 246, respectively, to potentiometers 240 and 241 which control the grid voltage on these two tubes. Adjustment of potentiometer 240 sets the plate current of vacuum tube 211 equal to that of vacuum tube 212. Similarly, potentiometer 241 adjusts the plate current of tube 213 equal to that of vacuum tube 214. Power is supplied to the triode connected vacuum tubes 211 and 212 through plate load resistors 247—248, peaking coils 249—250, and a common dropping resistor 251. The latter resistor 251 and condenser 252 provide high frequency plate decoupling. The two inductances 249 and 250, in conjunction with the common shunting capacitor 253, provide high frequency compensation. Resistor 266 and capacitor 267 which shunt the plate resistor 247 provide peaking at low frequencies to compensate for a phase shift at the low frequencies due to the coupling condensers 226 and 256 and associated grid resistors.

The combined balanced signal which appears in the output plate circuits of the first two tubes is coupled by capacitors 256 and 257 to the control grids of the tubes 213 and 214 of the second balanced stage. The two resistors 234 and 235 provide local feedback similarly to the two resistors 231 and 232 in the first stage, and the large common cathode resistor 236 provides further balancing of the combined signal in the output circuit. Power is supplied to the second balanced stage by plate resistors 258 and 259 and a common resistor 260. Two condensers 261 and 262 couple the output into two load resistors 263 and 264 which make the output impedance of the amplifier equal to a balanced 110 ohms for application to a balanced video line 265.

Figures 11, 11A:
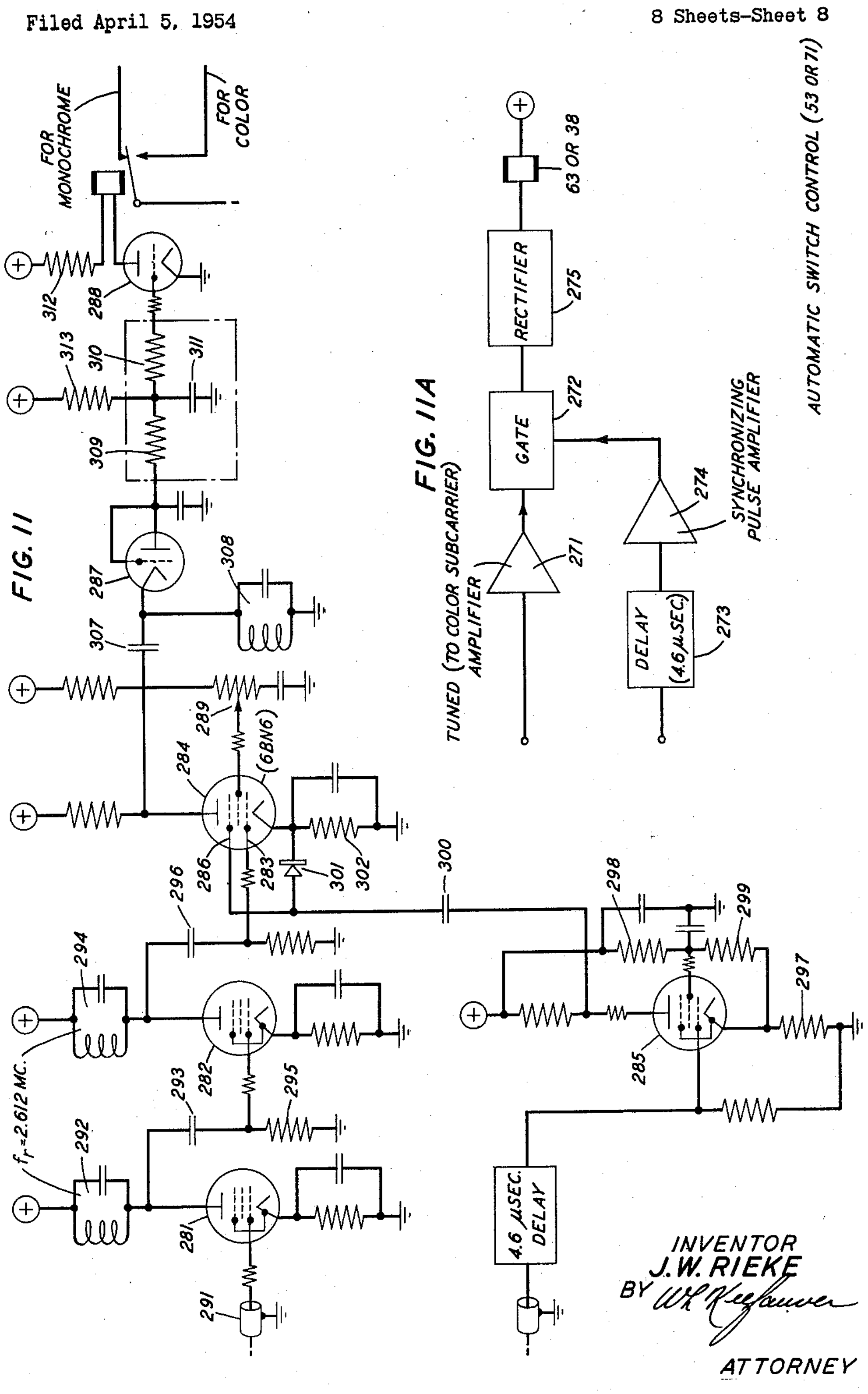

The automatic switch control is illustrated in detail in Fig. 11 and functionally in Fig. 11A. This circuit determines the monochrome or color nature of the input signal at both the transmitting terminal and the receiving terminal and makes the correct circuit connections for the proper processing of that signal.

The general operation of the circuit may be understood by referring first to the functional diagram in Fig. 11A. The color signal is amplified by a tuned amplifier 271 which is tuned to the frequency of the color subcarrier and applied to a first input of a gate 272. This amplifier, therefore, selects and amplifies input signals lying in a narrow frequency band about the location of the color subcarrier. The second or gating input is supplied by the monochrome signal, which is delayed by a 4.6 microsecond delay 273 so that at the gate 272 the synchronizing pulses will coincide in time with the burst of color carrier if present. At the receiving terminal, the 4.6 microsecond delay is obtained without a separate delay network 273. The amplifier 274 selects and amplifies the synchronizing pulses from the input monochrome signal and applies them to this second input.

The gate 272 will produce an output only if a burst of color carrier is present when the gate is partially enabled by the synchronizing pulses. In effect, the gate samples a narrow band of frequencies including $f_c$, the color subcarrier, once each scanning line of the input television signal and produces an output if the input signal is a color signal and no output if a monochrome signal. The output of the gate is rectified by a rectifier 275 and controls the operation of a relay, 38 at the transmitting terminal, 63 at the receiving terminal, which performs the necessary switching function.

Details of the circuit are illustrated in Fig. 11. In general, the color television signal with its color carrier at 2.612 megacycles after frequency translation is amplified by two tuned stages of amplification comprising tubes 281 and 282 and applied to a first grid 283 of a gated beam vacuum tube 284. A standard television signal, which has been delayed 4.6 microseconds, is applied to an amplifier stage comprising tube 285 which removes part of the picture content while amplifying the synchronizing pulses. The delayed positive synchronizing pulses are applied to a second grid 286 of the gated beam tube 284. When the second grid 286 is driven positive, the tube will conduct; and since the color burst occurs only during the delayed synchronizing pulse interval, some 2.612 megacycles energy, if present, will be transmitted to the anode circuit of tube 284. The color burst in the output of the gated beam tube is rectified by rectifier tube 287, and the resultant negative direct current is applied as a cut-off voltage to the grid of a triode vacuum tube 288. A normally operated relay 38 or 63 connected in the plate circuit of this tube does the actual switching.

In more detail, an unbalanced cable 291 containing the input signal is connected to the control grid of a vacuum tube 281 connected as a tuned amplifier. The LC network 292 is tuned sharply to resonance at 2.612 megacycles, thus achieving maximum gain at this frequency. The plate of this first stage is coupled through a condenser 293 to the grid of a second amplifying stage which also has a single tuned circuit plate load 294 tuned to 2.612 megacycles. The resistor 295 determines the gain of the first stage. Amplifiers 281 and 282 in effect select and amplify a narrow band of the input signal on cable 291 which includes the color subcarrier $f_c$=2.612 megacycles. The output of the second stage is coupled through a condenser 296 to a first grid 283 of the gated beam tube 284. This tube is a special tube coded 6BN6 and this grid 283 is the one generally known as the limiter grid.

A second input to the gating tube 284 consists of a video signal either monochrome or color which is applied to the control grid of a vacuum tube 285. A small amount of cathode degeneration is provided by the resistor 297, but the voltage drop across it provides ample bias for the tube due to the additional screen grid bleeder current which flows through it by virtue of the screen grid voltage divider comprising the two bypassed resistors 298 and 299. The amplified positive synchronizing pulses are applied through a capacitor 300 to a second grid 286 of the tube 284 which is generally known as the quadrature grid. The signal here is of sufficient amplitude that the 6BN6 conducts only during synchronizing pulses.

Plate conduction of the gated beam tube due to signals on the limiter grid 283 occurs only when the quadrature grid 286 is more positive than about −3 volts. The diode 301 acts as a direct-current restorer in a conventional manner and lines up the positive tips of the synchronizing pulses at a voltage equal to the cathode voltage in tube 284. This insures that the tube will conduct only over the part of the synchronizing pulse amplitude lying between zero and approximately −3 volts, with respect to the cathode, and the picture components below −3 volts have no effect. Since the synchronizing pulses have previously been delayed by an amount necessary to cause their centers to coincide with the center of the color burst, it follows that color burst energy will appear in the plate circuit of this tube 284 provided a burst of color subcarrier was present in the input. The screen grid voltage is adjusted by potentiometer 289 to compensate for 6BN6 tube variations.

The 2.612 megacycle color burst energy from the plate of the gated beam tube is coupled through a capacitor 307 to the cathode of a diode connected triode 287. Shunting this connection is an LC network 308 tuned to resonance at 2.612 megacycles which acts as a tuned plate load for the gated beam tube 284. The 2.612 megacycle energy is rectified by the diode 287 and filtered by the resistance-capacitance filter comprising the two resistors 309, 313 and capacitor 311.

The rectified filtered energy is applied as a negative voltage to the grid of the triode 288. A relay (38, 63) and dropping resistor 312 constitute the plate load of this vacuum tube which is normally conducting so that the relay is normally operated. When a color signal is applied to the circuit, the resulting negative voltage on the grid of tube 288 cuts the tube off and causes the relay to release. As indicated, when operated, the relay makes connections for transmitting monochrome signals and, when released, makes connections for transmitting color signals.

The negative voltage developed by the rectifier diode 287 is much greater than the cut-off range of the triode 288. For a maximum operating margin, it is desirable to line up the mean of the negative diode voltage with the center of the triode cut-off characteristic. This is accomplished by connecting the grid resistor 310 to a resistance divider 313, 309 instead of directly to the diode plate, thus adding a small positive bias voltage to the negative diode output.

The circuit just described provides automatic switching as required by the character of the television signal being handled. A manually operated switch may also be provided to switch from a color to a monochrome basis, or vice versa, if desired by substituting selected fixed relay currents for the plate current of tube 288.

Although the invention has been illustrated by specific embodiments, other embodiments and modifications will readily occur to one skilled in the art so that the invention should not be deemed limited to the embodiments specifically shown and described.

What is claimed is:

1. Television signal processing means having an input for receiving signals to be processed and an output circuit to which processed signals are applied, said processing means comprising apparatus intermediate said input and said output which is controllably adaptable to process either monochrome television signals or NTSC color television signals, said color signals being characterized by bursts of energy at the frequency $f_c$ of the color subcarrier, said frequency $f_c$ being high relative to the line scanning rate and located so that monochrome energy at the frequency $f_c$ is substantially less than the energy of said burst, and control means for automatically adapting said apparatus to process input signals in accordance with the monochrome or color nature of said input signals, said control means comprising amplitude sensitive means for sampling a narrow band of said received signals including the frequency $f_c$ and switching means responsive to the amplitude of the output of said sampling means for adapting said apparatus.

2. The combination in accordance with claim 1 wherein said color bursts occur at predetermined times within each frame of said color signals and means for enabling said sampling means only during said predetermined times.

3. The combination in accordance with claim 2 wherein said sampling means is normally disabled, wherein said monochrome and color television signals include synchronizing pulses and wherein said last-named means comprise means for deriving said synchronizing pulses from said received signals and means for applying said synchronizing pulses to said sampling means to enable the same.

4. In a television system for transmitting either monochrome or color television signals over a transmission medium of restricted band width, said color television signals having luminance sideband information and chrominance sideband information interleaved with said luminance sideband information and located about a color subcarrier of frequency $f_c$, means for receiving video frequency television signals for transmission, monochrome transmitting apparatus comprising means for translating input monochrome signals in frequency into the frequency band of said transmission medium, chrominance transmitting apparatus comprising means for separating said chrominance sidebands from said received signals, means for translating said separated chrominance sidebands in frequency into a band within the said frequency band of said transmission medium, and means for reducing the band width of said separated chrominance sidebands, means for sampling once per frame a narrow frequency band including $f_c$ to determine the presence or absence of the color subcarrier, switching means responsive to the absence of said color subcarrier for applying the output of said monochrome transmitting apparatus to said transmission medium and for maintaining the output of said chrominance transmitting apparatus disconnected from said transmission medium, and said switching means responsive to the presence of said color subcarrier for reducing the band width of the output of said monochrome transmitting apparatus and for applying the reduced band output of said monochrome transmitting apparatus and the frequency translated reduced band chrominance sidebands to said transmission medium.

5. A television transmission system comprising transmitting and receiving terminals each operable on either a monochrome or a color basis and interconnected by a transmission medium having a band width less than that of television signals to be transmitted, said transmitting terminal comprising means for applying the full band of input signals to said medium when operating on a monochrome basis, and means for applying a reduced band of input signals to said medium when operating on a color basis, said last-named means comprising means for separating luminance and chrominance components of color television signals, means for band limiting each of said components, means for translating said band limited components into adjacent portions of the frequency spectrum, and means for applying said translated components to said transmission medium, and said receiving terminal when operating on a color basis comprising means for separating the luminance and chrominance components of received color signals, means for translating said separated components into their original relative locations in the frequency spectrum, and means for combining said translated components, said transmitting and receiving terminals each including automatic switching means responsive to the magnitude of energy at the frequency of the color subcarrier for switching their respective terminals from a monochrome basis to a color basis or vice versa.

6. In a transmission system of restricted band width, terminal apparatus for alternatively processing monochrome television signals having significant low frequency components below the pass band of said system or color television signals having significant components both below and above the pass band of said system, monochrome processing apparatus comprising means for shifting monochrome signals upward in frequency into the pass band of said system so that said significant low frequency components fall within said pass band; color processing apparatus comprising means for separating chrominance and luminance components of color signals into two paths, means in each path for reducing the band width of said separated components, means in each path for shifting the said separated components in frequency into the pass band of said system and means for recombining said frequency shifted components; and means for controlling the processing of input signals by either said monochrome or said color apparatus comprising amplitude sensitive means for producing control signals which discriminate between input signals above and below, respectively, a threshold amplitude level which is greater than the amplitude of monochrome signals at the frequency of the color subcarrier but less than the amplitude of the color subcarrier, means for limiting the frequency response of said amplitude sensitive means to a narrow band including the frequency of said color subcarrier and switching means responsive to said control signals for controlling said process controlling means.

7. Television apparatus comprising a receiving circuit for input television signals, switching means and a control circuit for controlling said switching means in accordance with the monochrome or color nature of said input signals, said input signals comprising picture information and recurrent synchronizing pulses, the picture information of said color signals comprising luminance signal information and a color subcarrier with associated chrominance signal sidebands, said control circuit comprising a gating circuit having two inputs and an output, means for deriving energy from said input signals at the frequency of said color subcarrier, means for applying said derived energy to a first of said inputs, means for deriving said synchronizing pulses from said input signals, means for applying said derived synchronizing pulses to a second of said inputs, and means for applying the output of said gating circuit to said switching means to control the same.

8. The combination in accordance with claim 7 and biasing means for establishing a threshold gating level for said gating circuit intermediate the normal level at said first input of said color subcarrier and the normal level at said first input of said luminance signal information in the immediate vicinity of the frequency of said color subcarrier.

9. The combination in accordance with claim 7 wherein said gating circuit comprises a space discharge device having a cathode, anode, and first and second grid electrodes, and wherein said pair of inputs comprises said first and second grids.

10. The combination in accordance with claim 9 and means for biasing said space discharge device in a conducting state only during said synchronizing pulses.

11. The combination in accordance with claim 7, said means for deriving energy at the frequency of said color subcarrier comprising an amplifier having a sharply tuned load circuit tuned to resonance at the frequency of said color subcarrier.

12. The combination in accordance with claim 7 wherein said switching means comprise a relay, means for holding said relay normally operated, and said gating circuit comprising means responsive to said color subcarrier for causing said relay to release.

13. Terminal apparatus in a system for transmitting over a transmission medium having a low frequency cutoff at approximately 50 kilocycles and a high frequency cut-off at approximately three megacycles either monochrome television signals, the video wave form of which has luminance signal sidebands extending from zero frequency to approximately four megacycles, or color television signals, the video wave form of which has luminance signal sidebands from zero frequency to approximately four megacycles, and a color subcarrier at approximately 3.6 megacycles with an approximately 1.5 megacycle band of chrominance signal sidebands, said apparatus comprising a luminance channel and a parallel chrominance channel having a common input and a common output, said luminance channel comprising a first modulator means for shifting the frequency of input signals by approximately 300 kilocycles and a low-pass filter having a high frequency cut-off at approximately two megacycles, and said chrominance channel comprising means for selecting from input signals a band of approximately .6 megacycle centered on the frequency of said color subcarrier, and a second modulator means for shifting the frequency of said .6 megacycle band of signals by approximately one megacycle so that frequencywise said .6 megacycle band lies adjacent the output of said luminance channel.

14. The combination in accordance with claim 13, means for connecting said filter in said luminance channel in series with said modulator, means for connecting said chrominance channel between said input and said output, and switching means responsive to the presence of said color subcarrier at said input for disconnecting said filter from said luminance channel and said chrominance channel from said output.

15. The combination in accordance with claim 13 wherein said system includes a source of pilot frequencies and means for transmitting said pilots over said system, and a source of modulating waves for said second modulator comprising means for deriving from said pilot frequencies a wave the frequency of which differs from the frequency of said color subcarrier by approximately one megacycle.

16. The combination in accordance with claim 15 wherein said source of modulating waves comprises an oscillator tuned approximately to a frequency differing from the frequency of said color subcarrier by about one megacycle and means for synchronizing said oscillator by one of said pilot frequencies.

17. Television signal processing equipment having an input to which either monochrome or color television signals are applied and an output, said color signals having luminance components and chrominance components and a total band width comparable to the band width of said monochrome signals, the more important luminance components of said color signals being separated in frequency from the more important chrominance components, said chrominance components comprising sidebands of a color subcarrier whose amplitude is substantially greater than luminance components at the frequency of said color subcarrier, said equipment comprising a luminance channel, filter means for restricting the transmission of said luminance channel to the said more important luminance components, a chrominance channel, means connecting said luminance channel between said input and said input, controllable switching means operable in a first condition for disabling said chrominance channel and for removing said filter means from said luminance channel, said switching means operable also in a second condition for inserting said filter means in said luminance channel and for connecting said chrominance channel in parallel with said luminance channel between said input and said output, means for detecting the absence or presence of said color subcarrier in said input signals comprising gating means for sampling the amplitude of said input signals in a narrow band including the frequency of said color subcarrier, and means responsive to the detection by said gating means of the absence or presence, respectively, of said color subcarrier for controlling said switching means to operate in said first or said second condition, respectively.

References Cited in the file of this patent

UNITED STATES PATENTS

| | | |
|---|---|---|
| 2,163,403 | Meacham | June 20, 1939 |
| 2,635,140 | Dome | Apr. 14, 1952 |
| 2,657,253 | Bedford | Oct. 27, 1953 |
| 2,664,462 | Bedford | Dec. 29, 1953 |